United States Patent
Grossmann et al.

(10) Patent No.: US 6,895,929 B2
(45) Date of Patent: May 24, 2005

(54) METHOD AND ARRANGEMENT FOR DETERMINING AN IMPACT-FREE EXTREMAL ACTUATING POSITION OF AN ACTUATING MEMBER OF AN INTERNAL COMBUSTION ENGINE

(75) Inventors: Alex Grossmann, Gernsbach (DE); Torsten Baumann, Eppingen-Adelshofen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/622,156

(22) Filed: Jul. 18, 2003

(65) Prior Publication Data

US 2004/0011329 A1 Jan. 22, 2004

(30) Foreign Application Priority Data

Jul. 19, 2002 (DE) ......................................... 102 32 876

(51) Int. Cl.[7] .............................................. F02D 9/10
(52) U.S. Cl. ................... 123/399; 123/361; 123/568.21
(58) Field of Search ................................ 123/361, 399, 123/568.21, 568.23

(56) References Cited

U.S. PATENT DOCUMENTS

| 5,578,749 | A | * | 11/1996 | Mogaki | 73/118.1 |
|---|---|---|---|---|---|
| 5,586,534 | A | * | 12/1996 | Fujimoto | 123/325 |
| 6,032,519 | A | * | 3/2000 | Ishii et al. | 73/117.3 |
| 6,062,198 | A | * | 5/2000 | Loehr | 123/399 |
| 6,170,461 | B1 | * | 1/2001 | Pursifull | 123/399 |
| 6,352,064 | B1 | * | 3/2002 | Tomita et al. | 123/399 |
| 6,390,062 | B1 | * | 5/2002 | Saito et al. | 123/361 |
| 6,510,840 | B2 | * | 1/2003 | Tadashi | 123/399 |
| 6,539,918 | B1 | * | 4/2003 | Pursifull | 123/399 |
| 6,588,400 | B2 | * | 7/2003 | Gyoergy et al. | 123/361 |
| 6,619,259 | B2 | * | 9/2003 | Tomita et al. | 123/399 |

* cited by examiner

Primary Examiner—Erick Solis
(74) Attorney, Agent, or Firm—Walter Ottesen

(57) ABSTRACT

A method and an arrangement for determining an impact-free extremal set position of an actuating member (1, 5) of an internal combustion engine (10) provides for an increase of the tolerances in the position of the actuating member and a reduction of the requirements on the mechanics of the actuating member and the read-back accuracy for the set position. In the extremal set position of the actuating member (1, 5), an actuating quantity, which is to be adjusted, has an extreme value. In an operating state of the internal combustion engine (10), which is substantially independent of the set position, the actuating quantity is measured with the aid of a sensor (15, 20) for various set positions in a range wherein the extreme value for the actuating quantity is suspected and that set position is determined as the extremal set position whereat the measured actuating quantity has an extreme value.

10 Claims, 5 Drawing Sheets

METHOD AND ARRANGEMENT FOR DETERMINING AN IMPACT-FREE EXTREMAL ACTUATING POSITION OF AN ACTUATING MEMBER OF AN INTERNAL COMBUSTION ENGINE

BACKGROUND OF THE INVENTION

The use of electrically driven throttle flaps as part of en E-GAS system is already known. Usually, structures are used wherein, at a lower mechanical stop, a position of the throttle flap with minimal air leakage is reached as shown in FIG. 5a. The throttle flap is identified in FIG. 5a by reference numeral 1. FIG. 5d shows a typical position of the throttle flap during driving operation. An upper mechanical stop lies in the vicinity of the maximum possible air throughput. In order to ensure an emergency driving when there is a malfunction of the E-GAS system, there is, as a rule, still a rest position just above the lower mechanical stop and this is the so-called emergency air position of the throttle flap 1 as shown in FIG. 5b.

Systems having a so-called through-plunging throttle flap as shown in FIGS. 4a to 4c are also known. Here, the emergency air position can lie at the lower mechanical stop shown in FIG. 4a or on the side lying opposite the lower mechanical stop as shown in FIG. 4a in phantom outline. The minimum air throughput results with a perpendicular position of the throttle flap 1 as shown in FIG. 4b. FIG. 4c, in turn, shows a typical position of the throttle flap 1 during driving operation wherein the upper mechanical stop lies in the vicinity of the maximum possible air throughput. A system of this kind with a through-plunging throttle flap 1 has some advantages. On the one hand, a simpler mechanical structure of the reset mechanism results and, on the other hand, the control path, which results with the control of the position of the throttle flap 1, has, depending upon the emergency air position, no turning point at the emergency air position and is therefore simpler to master. In FIG. 4a, such an emergency air position without a turning point is the emergency air position shown in phantom outline and lying opposite to the lower mechanical stop. Thirdly, a flatter ascending characteristic line for the air throughput is achieved which, in any event, facilitates reaching the necessary precision in the adjustment of the throttle flap 1 for the idle control of the internal combustion engine.

What is problematic with the through-plunging throttle flap is, however, that the position of the throttle flap 1 with minimum leakage air, that is, the position with minimum air throughout, must be known to the E-Gas system in order to make possible an idle control with very small air mass flows. In a conventional throttle flap according to FIGS. 5a to 5c, the position of the throttle flap 1 with minimum air leakage can be simply learned because, for this purpose, simply the lower mechanical stop can be approached and the read-back values of a sensor (not shown) for the position of the throttle flap 1 can be stored in a control apparatus.

In a through-plunging throttle flap, only the lower mechanical stop can be learned in this way which, however, is of no consequence during normal operation. The position of the throttle flap 1 with minimal air leakage must now either be known very accurately with respect to the mechanical stop(s) or be very accurately known absolutely as a read-back voltage of the sensor for the position of the throttle flap 1 in order to ensure that, on the one hand, positions of the throttle flap 1 with very low air leakage can be approached and, on the other hand, it is avoided to come to the again increasing portion of the air mass flow in the closing direction of the throttle flap, that is, in the direction of the lower mechanical stop. The air mass flow as a function of the throttle flap angle is shown by way of example in FIG. 3. Here, it can be seen that, in the direction of the lower mechanical stop in the region of negative angles of the throttle flap 1, the air mass flow again increases. The air mass flow is plotted in kg/h as a function of the angle of the throttle flap. Furthermore, it must be ensured that this position with minimum air leakage changes only very slightly over the service life of the internal combustion engine which imposes high requirements on the mechanics, read-back tolerances and manufacturing tolerances.

SUMMARY OF THE INVENTION

The method of the invention and the arrangement of the invention afford the advantage compared to the foregoing that in an operating state of the internal combustion engine, which is substantially independent of the position, the position quantity is measured by means of a sensor for different positions in a range wherein the extreme value is assumed for the actuating quantity and that position is determined as the extremal actuating position wherein the measured actuating quantity exhibits an extreme value. In this way, during operation of the engine, the position or the actuating position of the actuating member with the extremal actuating quantity (for example, at minimum air leakage) is determined independently of the position of a mechanical stop for the actuating member. With a repeated determination of the actuating position of the actuating member with extremal actuating quantity, also changes during the service life of the engine are detect d so that the requirements on the mechanics, read-back tolerances and manufacturing tolerances can be lower. In this way, an increase of the tolerances in the system with the actuating member is possible because the total system becomes more robust.

Costs can also be saved by reducing the requirements on the actuating member or an increased reliability or robustness can be obtained especially over the service life of the internal combustion engine.

It is especially advantageous when an overrun operation is selected as an operating state. In overrun operation, the engine requires no air because it is anyway only dragged. For this reason, it is possible to shift an actuating member, which is configured as a throttle flap or an exhaust-gas recirculation valve, in order to measure the characteristic line of the air mass slow of the above-mentioned actuating members and to determine the extreme value of the characteristic line.

A further advantage is that an idle operation is selected as an operating state. In this way, an operating state of the engine is likewise available wherein the engine needs only little air and therefore an actuating member can be shifted in order to measure the characteristic line of the air mass flow and to determine the minimum of this characteristic line. This actuating member is configured as a throttle flap or an exhaust-gas recirculation valve.

A further advantage is that the measuring operation is interrupted when the idle rpm drops below a pregiven value and that the last-determined measured value is interpreted as an extreme value for the actuating quantity. In this way, an estimate for the extreme value of the actuating quantity results therefore the corresponding set position of the actuating member. This set position is anyway necessary with a suitable selection of the pregiven value in order to maintain the operation of the engine.

A further advantage is that an exhaust-gas recirculation valve is opened when an intake manifold pressure of the engine drops during the measuring operation below a pregiven critical value especially for a pregiven time.

A further advantage is that an air quantity or a pressure is used as the actuating quantity, especially the pressure in the intake manifold of the engine. In this way, sensors, which are anyway present in the air supply of the engine, can be used for measuring the actuating quantity so that no additional complexity and no additional costs are necessary.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
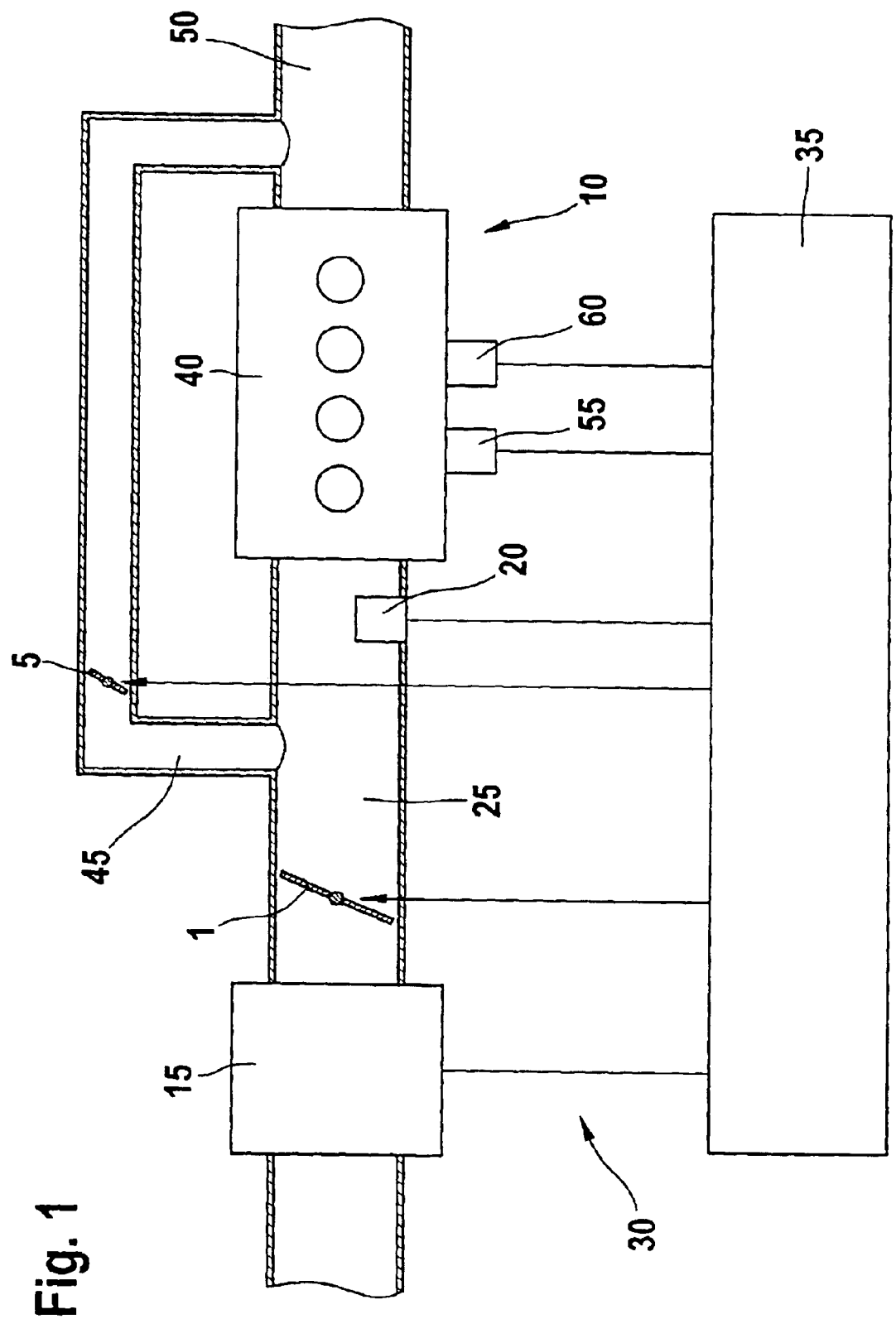
FIG. 1 is a block circuit diagram of an internal combustion engine having an arrangement according to the invention.

In FIG. 1, reference numeral 10 identifies an internal combustion engine assembly incorporating an internal combustion engine 40 to which air is supplied via an intake manifold 25. A sensor 15 is mounted in the intake manifold 25 for detecting the air mass flow. The sensor 15 can, for example, be a hot-film air-mass sensor.

In the following and by way of example, it is assumed that the sensor 15 is such a hot-film air-mass sensor. The air mass flow in the intake manifold 25 is detected by the hot-film air-mass sensor 15 and is supplied to a control 35 which, for example, can be part of the engine control of the internal combustion engine 10. A throttle flap 1 is driven by the control 35 and is mounted downstream of the hot-film air-mass sensor 15 in the intake manifold 25 of, for example, an E-GAS system. An intake manifold pressure sensor 20 is mounted in the intake manifold 25 downstream of the throttle flap 1. An exhaust-gas recirculation channel 45 having an exhaust-gas recirculation valve 5 opens into the intake manifold 25 between the throttle flap 1 and the intake manifold pressure sensor 20. The exhaust-gas recirculation valve 5 is driven by the control 35. Residual gas from an exhaust-gas system 50 of the engine 40 is supplied to the intake manifold 25 via the exhaust-gas recirculation channel 45 and the exhaust-gas recirculation valve 5. The values for the intake manifold pressure are determined by the intake manifold pressure sensor 20 and are likewise supplied to the control 35. An rpm sensor 55 is mounted on the engine 40 and measures the rpm thereof and is supplied to the control 55 as a measuring signal. A temperature sensor 60 for detecting the engine temperature is also mounted on the engine 40 and detects the engine temperature and supplies this engine temperature likewise as a measuring signal to the control 35.

According to the invention, an impact-free extremal set position of an actuating member of the engine 10 is determined at which an actuating quantity, which is to be adjusted, has an extreme value. In an operating position of the engine 10, which is substantially independent of the set position, the actuating quantities are each measured with a sensor for various set positions in a range wherein it is assumed that the extreme value for the actuating quantity is present and that set position is determined as the extremal set position at which the measured actuating quantity exhibits an extreme value.

In the example here described, the actuating member can be the throttle flap 1 or the exhaust-gas recirculation valve 5. In the case of the throttle flap 1, the set position is the throttle flap angle and the actuating quantity is the air mass flow, that is, the air throughput through the throttle flap 1. The extreme value of the air mass flow which is to be determined is, in this case, a minimum. In the case of the exhaust-gas recirculation valve 5, the set position is the degree of opening or the opening angle of the exhaust-gas recirculation valve and the actuating quantity is the residual gas mass flow in the exhaust-gas recirculation channel 45. The extreme value of the residual gas mass flow which is determined can, for example, likewise be a minimum.

Figure 3:
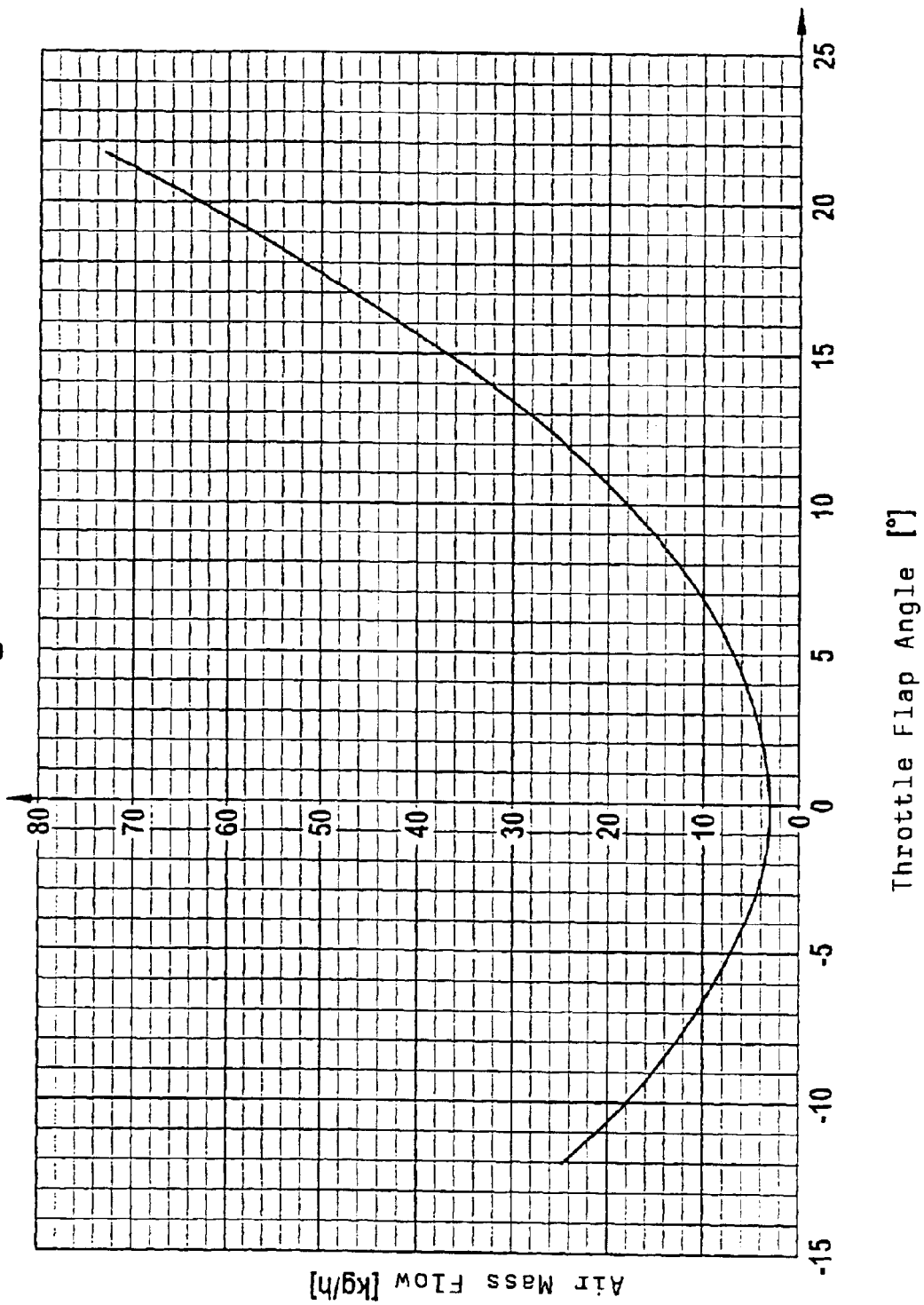
FIG. 3 shows a characteristic line of the air mass flow as a function of the angle of a throttle flap.
Figure 4A:
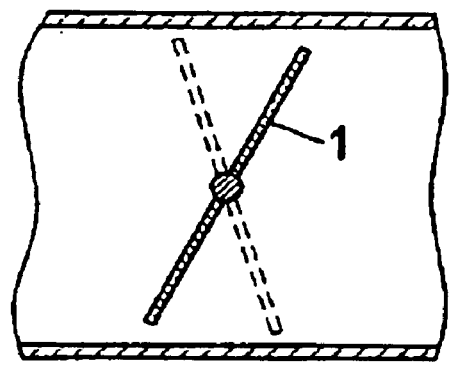
FIG. 4a is a schematic showing a position of a through-plunging throttle flap at a lower mechanical stop or in an emergency air position.
Figure 4B:
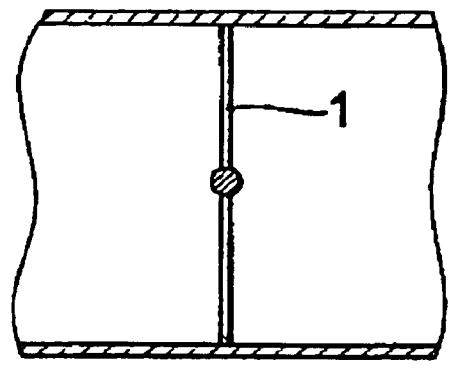
FIG. 4b is a schematic showing the position of the through-plunging throttle flap for a minimum air throughput.
Figure 4C:
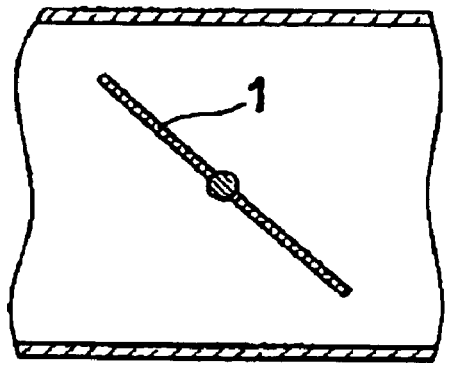
FIG. 4c is a schematic showing a position of a through-plunging throttle flap during driving operation of the internal combustion engine.
Figure 5A:
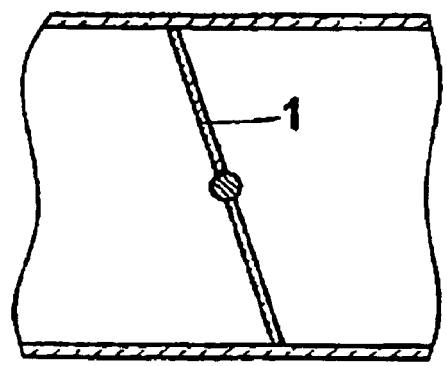
FIG. 5a shows a lower mechanical stop of a non-through-plunging conventional throttle flap.
Figure 5B:
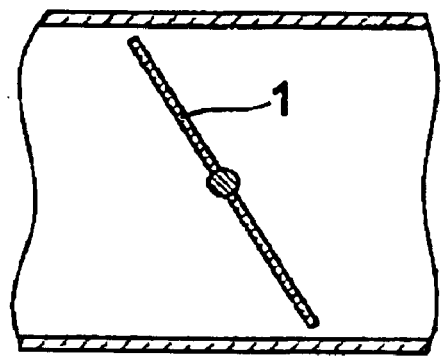
FIG. 5b shows an emergency air position of the conventional throttle flap.
Figure 5C:
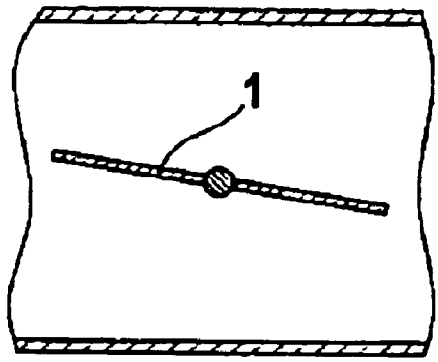
FIG. 5c shows a typical position of a conventional non-through-plunging throttle flap during driving operation of the internal combustion engine.

In the following, the method of the invention is described by way of example with respect to the actuating member configured as the throttle flap 1. In this example, the throttle flap 1 is a through-plunging throttle flap. Here, a position of the throttle flap for the minimum air throughput or the minimum air mass flow lies between the lower mechanical stop and the upper mechanical stop of the throttle flap. In FIG. 3, the air mass flow is plotted in kg/h as a function of the throttle flap angle in degrees. The trace of the curve shows a minimum for the air mass flow at the throttle flap angle of 0°. Because of the through-plunging of the throttle flap, an increasing air mass flow up to an angle of −12° results for negative throttle flap angles. The region of the negative throttle flap angles may not be approached during normal operation of the engine 10. For the normal operation of the engine 10, the set position of the throttle flap 1 is adjusted or controlled in the region of the positive throttle flap angles. The air mass flow increases with increasing throttle flap angle.

Because of manufacturing tolerances or deterioration, the minimum of the air mass flow can also lie at a throttle flap angle other than zero. According to the invention, the throttle flap angle for the minimum of the air mass flow should be determined as accurately as possible. For this purpose, the information of the sensors for the intake manifold pressure and/or the air mass are used, that is, the intake manifold pressure sensor and/or the hot-film air-mass sensor 15, in order to determine the throttle flap angle for the minimum air mass flow as accurately as possible in specific operating states of the engine 10. These sensors for the intake manifold pressure and/or the air mass are anyway present in the engine 10.

In the following, it is assumed by way of example that the engine 10 drives a vehicle. In normal driving operation, the engine 10 needs a specific air quantity in order to be able to generate the power wanted by the driver. In an operating state of the engine 10 for the normal driving operation, it is therefore not possible to adjust the throttle flap angle in order to measure the air mass flow characteristic line of FIG. 3 and to determine the minimum of the air mass flow characteristic line. However, there are driving situations or operating states of the engine 10 in which this is in principle possible. Thus, the engine 10 needs no air in overrun operation because it is anyway only dragged in such an operating state. Accordingly, it is possible during overrun operation to move the throttle flap 1 to close in order to determine the throttle flap angle as accurately as possible at which the air mass flow has a minimum. For this purpose, the measuring signal of the hot-film air-mass sensor 15 and of the intake manifold pressure sensor 20 can be evaluated in the control 35. In this way, the hot-film air-mass sensor, the intake manifold pressure sensor 20 and the control 35 form a device 30 according to the invention for determining as accurately as possible the impact-free extremal set position of the throttle flap 1 whereat the air mass flow is a minimum.

What can be critical here is that the intake manifold pressure of the engine 10 should not drop below a pregiven value during the measuring operation, especially for a pregiven time or longer. To make this possible, the exhaust-gas recirculation valve 5 could, for example, be opened when the intake manifold pressure of the engine 10 drops below the pregiven value during the measuring operation. It can be provided as optional that the exhaust-gas recirculation valve 5 is only opened when the drop below the pregiven value continues at least for the pregiven time. The opening of the exhaust-gas recirculation valve 5 can take place stepwise by respective pregiven incremental values. After each incremental increase of the opening of the exhaust-gas recirculation valve, a check is made as to if there is still a drop below the pregiven value for the intake manifold pressure. If this is the case, then a further incremental opening of the exhaust-gas recirculation valve 5 takes place; otherwise, the exhaust-gas recirculation valve 5 is not opened further. In this way, it can be ensured that there is no continuous drop below the critical intake manifold pressure for the operation of the engine 10.

The actual measuring operation after a detected overrun operation of the engine 10 takes place as follows. The through-plunging throttle flap 1 is shifted in steps, for example, of 1° in a range for the throttle flap angle wherein the air mass flow is assumed to be the minimum. This can, for example, be the range from −5° throttle flap angle to +5° throttle flap angle. For each step of the throttle flap angle, the measured values of the hot-film air-mass sensor 15 and/or of the intake manifold pressure sensor 20 are simultaneously recorded. In each case, this results in a measuring curve (in this example, 11 measuring points) for the air mass flow and the intake manifold pressure. From the measurement curve for the air mass flow, the minimum measured value for the air mass flow is determined. The corresponding throttle flap angle is stored in the control 35 as the set position of the throttle flap 1 whereat the air mass flow is a minimum. In this example, the measuring inaccuracy is +/−1° throttle flap angle compared to the actual minimum of the air mass flow based on the selected step width in the determination of the measurement curve. If a tighter measuring tolerance is required, then the step width can be correspondingly reduced. The measured values of the two measuring curves can, for example, be formed by averaging a measured value trace recorded per measuring point for a pregiven time. When each measured value is averaged, for example, over a pregiven time of 300 ms, then the above-described total measuring operation takes approximately 3.3 seconds. The measuring operation can be immediately interrupted in the event that the driver ends the overrun operation with a power request during the measuring operation. In the example described, a measuring curve for the air mass flow as well as for the intake manifold pressure was recorded in order to not continuously permit a drop below a critical intake manifold pressure. Alternatively, and especially for the case that no exhaust-gas recirculation valve is provided, it can be provided that only the measurement curve for the air mass flow is recorded.

As an alternative, it can be provided that the set position of the throttle flap 1 can be determined with the minimum air mass flow as accurately as possible indirectly in that only a measurement curve for the intake manifold pressure is recorded. Here, it can be assumed that for a minimum of the intake manifold pressure, there is also a minimum of air mass flow so that the throttle flap angle, for which the minimum intake manifold pressure is measured, is determined as a throttle flap angle for the minimum air mass flow.

In this case, a separate measurement of the air mass flow is not required.

Another measuring method can be realized during idle of the engine 10, for example, via a service center tester. Here, it should be ensured that-the engine 10 runs warm and is burdened with little load, that is, that no ancillary apparatus such as a climate control system is activated. It can be determined with the temperature sensor 60 whether the engine 10 is running warm. This is the case, for example, when the temperature of the engine 10 determined by the temperature sensor 60 exceeds a pregiven value. If the mentioned criteria are satisfied, then the described measuring method can be carried out during idle operation of the engine 10. However, this can lead to the situation that the engine 10 drops below the usual idle rpm during the measuring process. If the measuring process is, however, carried out in the service center, then this behavior is non-critical. If the rpm, which is detected by the rpm sensor 55, drops below a pregiven value during idle operation, then this can be used as an interrupt criterion for the above-described measuring operation. If interrupted, the last measured value for the air mass flow or the intake manifold pressure can be used as an estimated value for the throttle flap angle with minimum air mass flow because, in this case, the remaining leakage air quantity for the engine 10 is anyway sufficiently low.

Figure 2:
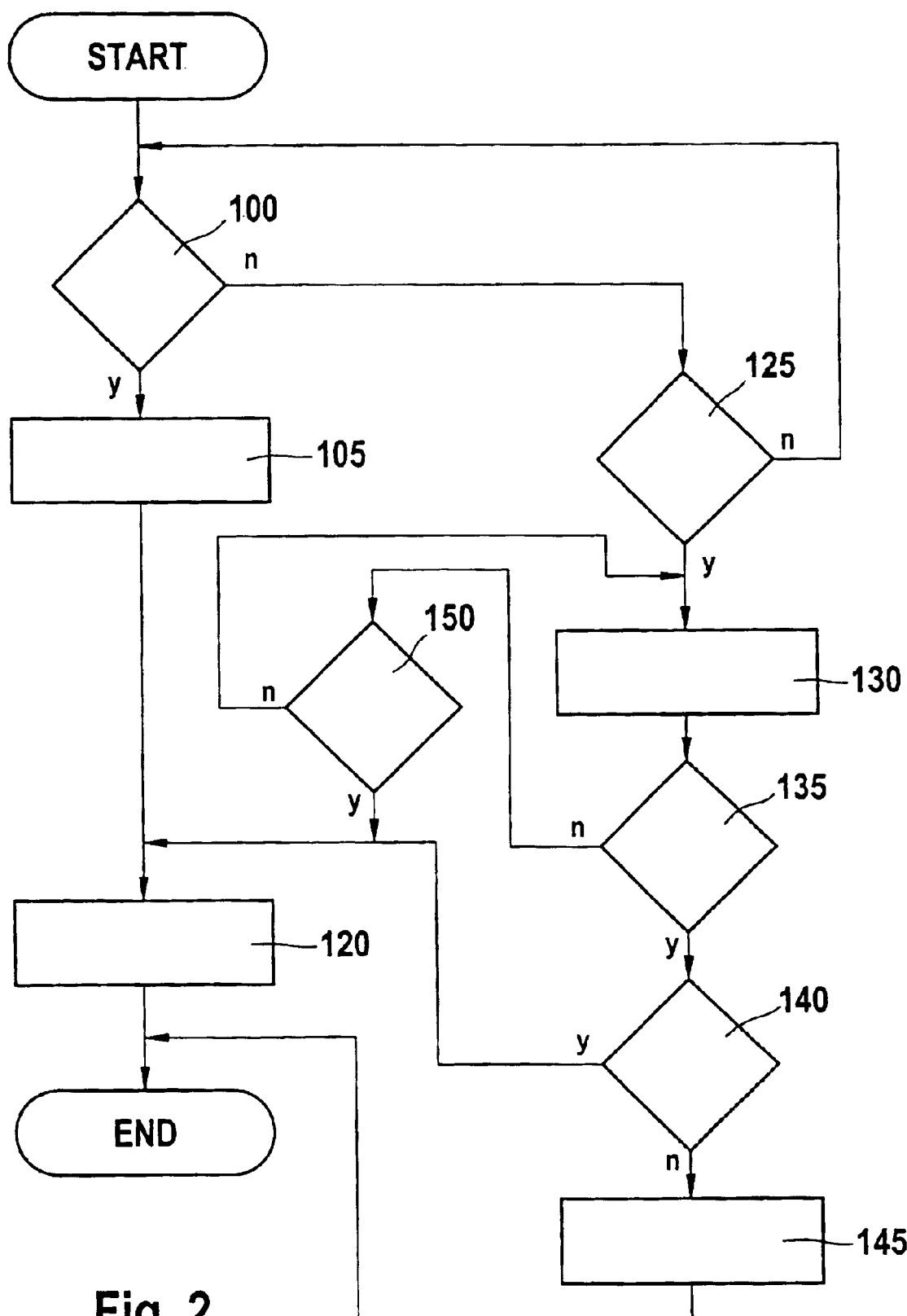
FIG. 2 shows a flowchart for explaining the method of the invention.

FIG. 2 shows a flowchart wherein the sequence of the method of the invention is explained again by way of example.

The start of the program can, for example, be coincident with the start of the engine 10. After the start of the program, a check is made by the control 35 at a program point 100 as to whether the engine 10 is in overrun operation. If this is the case, then the program branches to program point 105; otherwise, the program branches to program point 125. The check as to whether the engine is in overrun operation can take place in a manner known per se and is not the subject matter of this invention.

At program point 105 and in the above-described measuring operation, the control 35 initiates the corresponding stepwise drive of the throttle flap 1 and initiates the recordation of the measuring points of the hot-film air-mass sensor 15 and/or of the intake manifold pressure sensor 20 in the manner described and, if required, by including the exhaust-gas recirculation valve 5 in order to prevent a drop of the intake manifold pressure, which is too great, and to establish a connection via the exhaust-gas recirculation channel 45 to the exhaust-gas system 50 and therefore to the ambient pressure via a corresponding opening of the exhaust-gas recirculation valve 5. Thereafter, the program branches to program point 120. At program point 125, the control 35 checks whether the engine 10 is in idle operation. If this is the case, then there is a branching to program point 130; otherwise, there is a return branching to program point 100.

The check as to the presence of idle operation takes place in the manner known per se and is not the subject matter of the invention.

At program point 130, the control 35 records a measured value for the air mass flow in the manner described and/or a measured value for the intake manifold pressure with a stepwise determination of the throttle flap angle in the region wherein the minimum for the air mass flow is assumed. Thereafter, the program branches to program point 135. At program point 135, the control 35 checks whether the rpm of the engine 10 drops below the value pregiven for the rpm. In this case, there is a branching to program point 140; otherwise, there is a branching to program point 150.

At program point 150, the control 35 checks whether already all measured values in the region of the throttle flap position or of the throttle flap angle were determined with this region being assumed for the minimum of the air mass flow. If this is the case, there is a branching to program point 120; otherwise, there is a branching back to program point 130 and a new measured value for the air mass flow and/or the intake manifold pressure is recorded at a new throttle flap angle. At program point 140, the control checks whether all measured values for the air mass flow and/or the intake manifold pressure were recorded in the region of the throttle flap angle assumed for the minimum of the air mass flow. If this is the case, then there is a branching to program point 120; otherwise, there is a branching to program point 145. At program point 145, the last detected measured value far the air mass flow and/or the intake manifold pressure is evaluated as representative for the minimum air mass flow and the corresponding throttle flap angle is interpreted as the extremal set position of the throttle flap 1. Thereafter, there is a movement out of the program.

At program point 120, the control 35 determines the minimum value from the measurement curve for the air mass flow and/or the intake manifold pressure and interprets the corresponding throttle flap angle as the extremal set position of the throttle flap 1. Thereafter, there is a movement out of the program. The program can be started anew and run through as often as decided during the operation of the engine 10.

The overrun operation and the idle operation each define an operating state of the engine 10 substantially independently of the throttle flap angle. This is so in the case of overrun operation because an air supply to the engine 10 is not required and therefore the position of the throttle flap 1 can be any position desired. In the case of idle operation this is so because a drop of the idle rpm of the engine 10 by driving the throttle flap 1 closed is without effect on the idle operation insofar as there is no drop below the pregiven value for the rpm of the engine 10. If the measuring operation is interrupted in idle operation because there is a drop below the pregiven value for the rpm, then the last-detected value for the air mass flow and/or for the intake manifold pressure is, as a rule, in each case the lowest value of the particular measurement curve recorded up to then and represents the minimum leakage air quantity which is required in order not to drop below the pregiven value for the rpm.

The method of the invention can be utilized for each type of actuating member whose extreme position does not lie at the available mechanical stops and wherein an independent measurement of the actuating quantity is possible via a sensor which is different from the sensor for determining the set position of the actuating member.

It is understood that the foregoing description is that of the preferred embodiments of the invention and that various changes and modifications may be made thereto without departing from the spirit and scope of the invention as defined in the appended claims.

What is claimed is:

1. A method for determining an impact-free extremal set position of an actuating member of an internal combustion engine for which an actuating quantity, which is to be adjusted, has an extreme value, the method comprising the steps of:

providing an operating state of said engine substantially independent of said set position;

utilizing a sensor to measure said actuating quantity for each of a plurality of different set positions in a range of said set positions wherein said extreme value of said actuating quantity is suspected to lie; and, determining that set position as said extremal set position whereat the measured actuating quantity has an extreme value.

2. The method of claim 1, wherein said actuating member is a throttle flap or an exhaust-gas recirculation valve.

3. The method of claim 1, wherein an overrun operation of said engine is selected as said operating state.

4. The method of claim 1, wherein an idle operation of said engine is selected as said operating state.

5. The method of claim 4, comprising the further step of interrupting the measuring operation when the idle rpm drops below a pregiven value; and, that the last determined measured value for said actuating quantity is interpreted as said extreme value.

6. The method of claim 1, wherein an air quantity or a pressure of said engine is used as said actuating quantity.

7. The method of claim 6, wherein said pressure is the pressure in said intake manifold.

8. A method for determining an impact-free extremal set position of an actuating member of an internal combustion engine for which an actuating quantity, which is to be adjusted, has an extreme value, the method comprising the steps of:

providing an operating state of said engine substantially independent of said set position;

utilizing a sensor to measure said actuating quantity for each of a plurality of different set positions in a range of said set positions wherein said extreme value of said actuating quantity is suspected to lie;

determining that set position as said extremal set position whereat the measured actuating quantity has an extreme value; and, opening an exhaust-gas recirculation valve when an intake manifold pressure of said engine drops below a pregiven value during the measuring operation.

9. The method of claim 8, wherein said intake manifold pressure drops below said pregiven value for a predetermined time.

10. An arrangement for determining an impact-free extremal set position of actuating member of an internal combustion engine for which an actuating quantity, which is to be adjusted, has an extreme value, the arrangement comprising:

means for providing an operating state of said engine substantially independent of said set position;

a sensor for measuring said actuating quantity for each of a plurality of various set positions in a range of said set positions wherein said extreme value of said actuating quantity is suspected to lie; and, means for determining that set position as said extremal set position whereat the measured actuating quantity has said extreme value.

* * * * *